Dec. 9, 1969            R. A. SMITH            3,482,836

WOOD BOWLING PIN WITH PLASTIC PROTECTIVE CLADDING

Filed Jan. 21, 1966            2 Sheets-Sheet 1

A SINGLE LAYER CLADDING OF POLYURETHANE CONTAINING AS A REACTANT 4, 4' METHYLENE-BIS (2-CHLOROANILINE) OR METHYLENE DIANILINE, A PRIMER COATING BEING EXCLUDED

6 WOOD CORE OR BODY

INVENTOR.
RICHARD A. SMITH
BY
Arthur J. Plantamura
ATTORNEY.

Dec. 9, 1969  R. A. SMITH  3,482,836
WOOD BOWLING PIN WITH PLASTIC PROTECTIVE CLADDING
Filed Jan. 21, 1966  2 Sheets-Sheet 2

INVENTOR.
RICHARD A. SMITH
BY
ATTORNEY.

United States Patent Office 3,482,836
Patented Dec. 9, 1969

3,482,836
WOOD BOWLING PIN WITH PLASTIC
PROTECTIVE CLADDING
Richard A. Smith, Cornwall-on-Hudson, N.Y., assignor to American Machine & Foundry Company, a corporation of New Jersey
Filed Jan. 21, 1966, Ser. No. 534,946
Int. Cl. A63d 9/00
U.S. Cl. 273—82                                    3 Claims

ABSTRACT OF THE DISCLOSURE

A bowling pin having a preformed wood body or core encased in a plastic cladding, the cladding being a polyurethane reaction product of a polyol and an organic isocyanate and including as a reactant either 4,4′ methylenebis (2-chloroaniline) or methylene dianiline, the primer coating conventionally applied being omitted.

---

This invention relates to bowling pins and more particularly to an improved method for manufacturing plastic-coated bowling pins and to the pins so produced.

It has been the conventional practice in preparing plastic-coated wood pins to apply to the wood core a plurality of layers until a plastic coating of sufficient depth has been provided. This procedure is time consuming, cumbersome, and expensive and often results in a plastic coating which delaminates from the pin core under the rigorous impact conditions of use.

The present inveition is concerned with an improvement in the art of manufacturing plastic-coated bowling pins wherein a surface cladding comprising a single polymeric composition is applied, specifically a cladding of polyurethane. The invention is further concerned with a novel apparatus for applying said cladding. The resulting bowling pin is relatively easily manufactured, is attractive, and has a marked increase in durability and soil resistance.

In essence, the present invention is concerned with the manufacture of plastic-coated wood core bowling pins in which a single plastic is applied to the wood core thereby avoiding the need for impregnant or prime coatings for the wood, for sealer coats and for top coats, all of which heretofore were considered necessary in addition to the main protective coating in order to provide a commercially acceptable bowling pin. Although the invention herein provided is directed primarily to application in conjunction with wood core bowling pins, the invention may also be employed in conjunction with reinforced cores such as those utilizing mesh fabric envelopes, e.g., nylon webbing, over the pin.

It is an object of the present invention to provide a plastic-coated bowling pin of increased durability and resistance to soiling, and at less cost, in which a single composition is utilized as the plastic layer.

It s a further and more specific object of the present invention to provide a bowling pin containing as the sole surface cladding a single layer of polyurethane on the bowling pin core.

Additional objects and advantages will become apparent as the description of the invention progresses.

In order that the manner in which these and other objects are attained, in accordance with the invention, can be better understood, reference is made to the accompanying drawings wherein.

Figure 1:
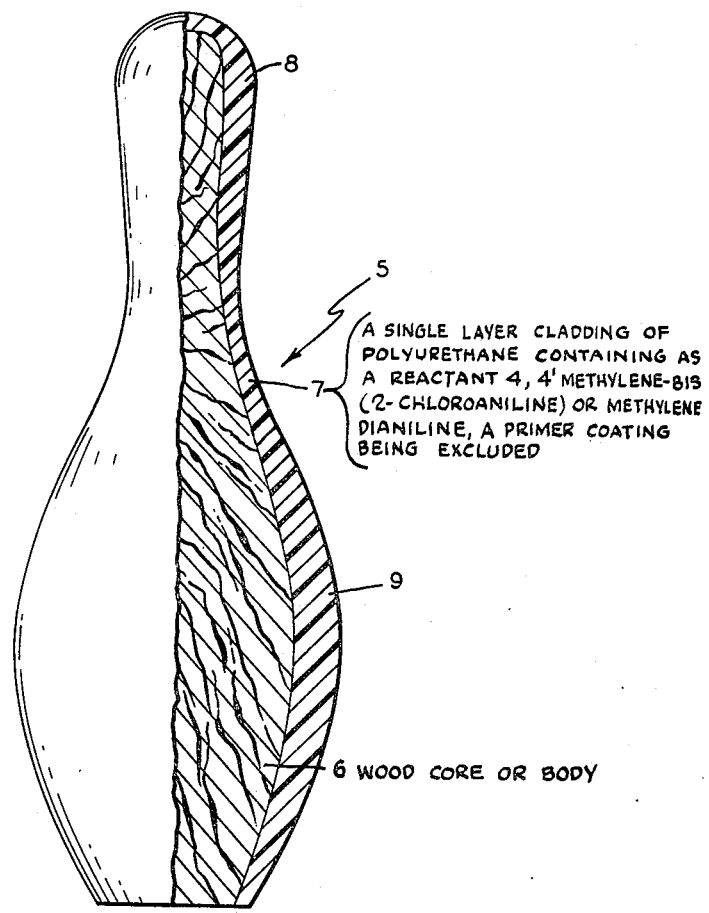
FIG. 1 is a view, partly in vertical elevation and partly in longitudinal section, of a bowling pin having a wooden body, produced in accordance with the invention, in which the wood is covered with a protective cladding comprising a resinous layer of polyurethane resin.

In order that the invention can be best understood, the general nature of the finished bowling pin will first be described with reference to the drawings. FIG. 1 illustrates the pin which can be made in accordance with the invention. It will be understood that the present invention is concerned essentially with the improvement comprising a bowling pin with a plastic cladding in which but a single synthetic resinous composition is utilized over the core and that said composition is polyurethane.

In the embodiment illustrated, the pin 5 comprises a pin body 6 of maple or other hardwood. The core is encased in accordance with the invention with a cladding or cover 7. In utilizing the single composition layer as taught by the present inventive concept, it is unnecessary to follow the prior art technique of pretreating the core with a plurality of layers including a primer impregnant composition to permeate the surface of the wood and a sealer coat in addition to the thick cushioning coat which generally consists of ethyl cellulose and is thereafter followed with a top coat or finishing coat. In accordance with the invention, a single layer of polyurethane resinous composition is used in lieu of the multiple coat system heretofore required. Of an extensive number of other synthetic resinous materials tried, none has proven satisfactory, including conventional nylon. Many resins could not be applied as a practical matter; others lacked suitable properties under test.

In the preferred embodiment of the invention, the polyurethane surface layer is flow-coated, sprayed, cast or injection molded directly over the core. No primer layer or impregnant is employed or is desirable. The coating produces a smooth, glossy, attractive appearance so that no finish or top coat is required, although for some applications it may be desirable to apply a thin top coat film. As shown in FIG. 1 of the drawing, the core is contoured so that thicker layers 8 and 9 are formed at the head and belly regions, respectively, where abuse and wear are most severe, although, if desired, the peripheral layer may be uniform.

The polyurethane protective layer components utilized in the invention are commercially available. They comprise elastomeric materials derived from liquid diisocyanate or triisocyanate compositions reacted with alcohols, i.e., ester and/or ether polyols.

The preparation of polyurethane compositions usually involves a two-step process in which the polymeric glycol preferably admixed with a diol and/or a triol is heated with an excess of an organic isocyanate and then mixed with a suitable amine such as 4,4′-methylene-bis(2-chloroaniline) or methylene dianiline.

Catalysts can greatly influence the rate of reaction of the isocyanates. Tertiary amines, such as triethylamine and nitrogen substituted morpholines, are commonly used. The material N,N,N′,N′-tetrabis (2 hydroxy propyl) ethylene diamine, otherwise known as Quadrol, having the structure:

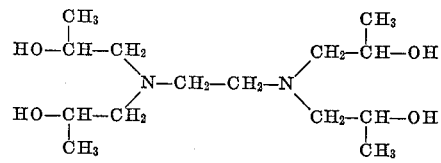

provides excellent results. This substance, in addition to its catalytic action, is a polyol and enters beneficially into the reaction through its various hydroxy groups.

Metallic catalysts are also of considerable merit, such as, for example, cobalt and lead driers, tin salts, iron salts, etc.

Of various polyols which may be used in the reaction with the organic diisocyanates so as to prepare the isocyanate-terminated polymer, the polyalkylene ether glycols are preferred. These glycols have the general $$HO-C_nH_{2n}-O-(C_nH_{2n})_x-OH$$

wherein the value of $x$ is such as to give a molecular weight less than about 8,000 when reacted with the isocyanate to form the polyurethane prepolymer, and $n$ is an integer having a value of at least 2 and not greater than 8.

When $C_nH_{2n}$ is $C_2H_4$, the polyol may be considered as a derivative of ethylene oxide or ethylene glycol. When $C_nH_{2n}$ is

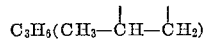

the polyol can be considered as a derivative of propylene oxide or propylene glycol. When $C_nH_{2n}$ is $C_4H_8$, the polyurethanes comprise those available commercially from E. I. du Pont as Adiprenes. These polymers may be considered derivatives of 1,4-butanediol, $HO(CH_2)_4OH$, or tetrahydrofurane

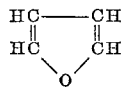

Where polyether polyols of the general formula: $HO-C_4H_8-O\ (C_4H_8)_xOH$ are reacted to various degrees with tolylene diisocyanate TDI in excess, products of varying molecular weights are derived. Three polyurethanes of excellent properties may be characterized within the general formula by the following data.

| Wt. percent free NCO: | Approx. mol. wt. |
|---|---|
| 4 | 3,000 |
| 6 | 1,500 |
| 9 | 850 |

In accordance with the present invention, the preferred polyalkylene ether glycol is the addition product of tetramethyleneglycol having a molecular weight of at least 500 and a free NCO percentage of at least 4%. This is a simple product formed from a few molecules but the polyol may be the interreaction product from many molecules. Where propylene oxide is used, for example, a branched chain is obtained.

The fundamental polyol unit need not be a simple glycol with adjacent hydroxyls but may be a diol where the hydroxyls are not adjacent as in the following:

The simplest polyether polyol from this base is:

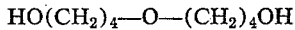

Also there may be other than four methylene groups and the polyether polyol may be of a more complex type represented by a condensation product of two or more different polyols (or polyols and ethylene oxide type compounds.) Examples are hexane triol and propylene oxide or hexane triol, pentane diol and propylene oxide. Many isomers and mixtures may be in the product. Suitable polyols, for example, are disclosed in U.S. Patents 2,901,467 and 2,917,489.

The isocyanates employed in synthesizing the polyurethanes may be aliphatic or aromatic. The most common aliphatic diisocyanate is methylene diisocyanate, commonly known as MDI. The most commonly used diisocyanate is tolylene diisocyanate, an aromatic popularly known as toluene diisocyanate (TDI). This name is used to include the isomers and mixtures of isomers of tolylene diisocyanate. The most commonly used of all diisocyanates is the TDI 80-20 mixture of 2,4-tolylene diisocyanate and 2,6-tolylene diisocyanate. Each NCO radical in these compounds may react in any one of various fashions. Due to the reactions possible, the large molecules formed will have multiple cross-links; the more numerous these are, in general, the more rigid and hard the final polymer will be; the less numerous, the softer and more flexible the polymer will be. The reaction to form a macromolecule provides a thermosetting polymer. In general, these can be post formed by the application of heat and pressure, so the materials, in fact, are thermoplastic thermosets.

The reactions go to virtual completion but it should be noted that they are reversible, so that new equilibria can be established with changes in properties. Extreme sensitivity to moisture of some polyurethane polymers is an example of this. As a class, there is a sensitivity to oxidative reactions; in general, otherwise, chemical and solvent resistance is good.

As representative of the typical organic isocyanates which may be used in preparing the novel coating compositions of the present invention, there may be mentioned m-phenylene diisocyanate, toluene - 2,4 - diisocyanate, hexamethylene-1,6-diisocyanate, tetramethylene-1,4-diisocyanate, cyclohexane-1,4-diisocyanate, naphthylene-1,5-diisocyanate, 1-methoxyphenyl-2,4-diisocyanate, methylene-bis-(4-phenylisocyanate), 4,4'-biphenylene diisocyanate. Mixtures of toluene-2,4- and 2,6-diisocyanate may be used. In general, the diisocyanates having the isocyanate groups substituted on aromatic rings are preferred since they are more reactive than the aliphatic diisocyanates, and, hence, require shorter reaction times to form the polyurethane coating compositions. From about 4.0 to 11.0 molar proportions of the organic diisocyanate reactant are generally employed. Suitable triisocyanates, e.g., toluene triisocyanates, may also be employed alone or admixed with one or more diisocyanates; see for example U.S. Patent 2,531,392.

The solvents which may be employed if desired in the preparation of these polyurethane coating compositions in coating procedures other than casting or molding are of the type which are non-reactive to the isocyanates, i.e., they should not have active hydrogens in their structure. Oxygen-containing solvents such as ketones, ethers, and esters are suitable, such as methyl ethyl ketone, acetone, dipropylether, $\beta,\beta$-dichloroethyl ether, dimethylformamide, tetrahydrofuran, acetate of the ethyl ether of ethylene glycol, ethyl acetate, methyl acetate, butylacetate, etc. They should be sufficiently low boiling so that they will readily evaporate when the solution is applied. In the preparation of the polyurethane coating composition, aromatic solvents such as toluene, xylene, etc., may be added to extend the solvent solution; however, care must be taken that mixtures of solvents do not precipitate part of the coating composition. Polyurethane compositions having concentrations up to 100% polyurethane may be used. Also the material may be prepared without solvent and then diluted if desired.

In applying the coating to the pin cores, any one of various suitable procedures such as casting the synthetic resinous liquid around the core in commercial available molding machines may be employed. Alternately, for example, a flow coating procedure wherein the liquid resin of suitable viscosity is poured slowly over a pin mounted on a rotating mandrel until a uniform coating of appropriate thickness is obtained may be used. Also a spray coat of a solution or of a 100% solids material may be used.

Figure 2:
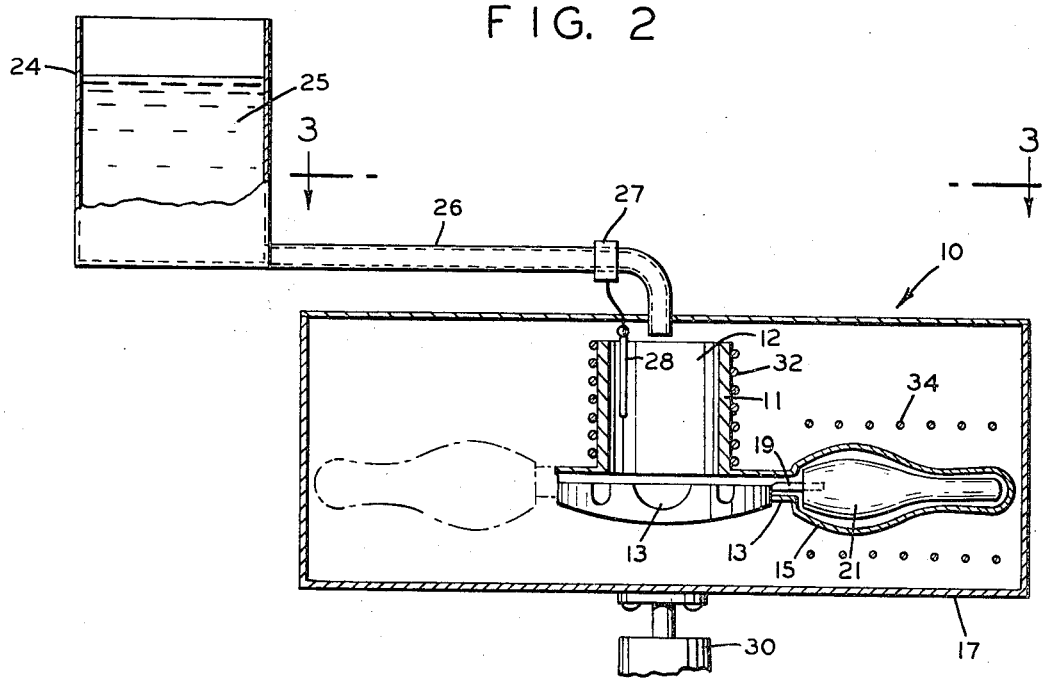
FIG. 2 is an elevational view, substantially in section, of a centrifugal casting device that may be employed in applying the plastic cladding to the cores.
Figure 3:
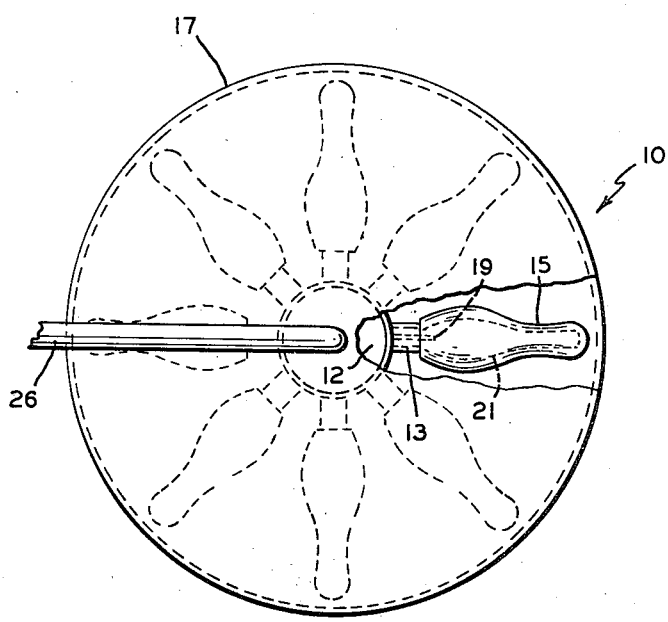
FIG. 3 is a plan view, partly broken away, of the centrifugal casting chamber taken along the line 3—3 of FIG. 2.

A suitable apparatus for centrifugally casting a coating over the pin core is illustrated in FIGS. 2 and 3 of the drawing. The molding apparatus shown comprises a wheel-like arrangement 10 in which the hub 11 is suitably equipped with a heating coil 32. The resin feed inlet 12 is arranged with feed conduits 13 to the individual molds 15 which are suitably secured and positioned in a manner resembling spokes of a wheel within the peripheral rim 17. Heating elements 34 are employed to maintain a proper temperature for the molds 15. Provided in each of the individual mold recesses is an article support 19 to hold the pin core 21 or other article to be coated in spaced relationship in the mold. Suitable means comprising a conventional mechanism (not shown) is used to rotate the cylindrical chamber on support 30 to provide the centrifugal force to feed the resin to the molds. Liquid resin 25 may be introduced from a reservoir or tank 24, through inlet pipe 26, suitably equipped with a valve 27, into the central feed inlet 12. The quantity of flow through the valve may be controlled automatically by the depth sensing element 28. It is thus seen that the rotating structure provides a simple and expeditious means of effectively molding around a plurality of cores simultaneously and with uniform results.

The following examples, in which the parts and/or percents recited are parts and/or percents by weight, are provided in order that the invention may be better understood. The examples are illustrative only and should not be interpreted as indicative of limitation on compounds or conditions stated. In each example, unless otherwise stated, a plastic cladding of 50 mils is applied to the bowling pin cores.

EXAMPLE 1

In a suitable apparatus equipped for mixing and spraying, two solutions are mixed at room temperature and applied to the object to be coated by spraying until a layer of 50 mils is obtained. Variations in coating depth may be obtained both through movement of the spray or by movement of the core in a controlled manner to control the pattern of coating thickness required.

Solution I is composed of:

| | Percent by wt. |
|---|---|
| Adiprene LD–315 [1] | 70 |
| Methylethyl ketone | 30 |

[1] Polyurethane of E. I. du Pont de Nemours having 9 percent by weight free NCO and a molecular weight of approximately 850 and is a viscous honey-colored liquid of specific gravity at 75° F. of 1.11; a Brookfield viscosity at 86° F. of 15,000±2500 cps. and 300–400 cps. at 212° F. It is described in E. I. du Pont de Nemours and Co. Inc. Adiprene® (Du Pont trademark) Bulletin No. 1, revised April 1963 and Techanical Information Sheet of May 25, 1961.

Solution II is composed of:

| | |
|---|---|
| Methylene dianiline | 15 |
| Mesityl oxide | 85 |

The two solutions are mixed and sprayed simultaneously in approximately stoichiometric proportions; 100 parts by weight of Solution I to 86.5 parts of Solution II.

The coating is given a post cure by the application of heat. In the case of a 50 mil coating, this is accomplished by heating 30 minutes at 100° C.

Bowling pins coated with the above material have excellent characteristics and a durability markedly superior to pins with present commercial coatings.

EXAMPLE 2

This example describes a flow coating formulation.

In a suitable container a mixture of the following, at room temperature, is prepared:

| | Parts by wt. |
|---|---|
| Polyurethane [1] | 450 |
| Trichloroethylene | 188 |
| Pigment mix [2] | 36 |
| Silicone fluid [3] | 0.25 |

[1] Having a molecular weight of aproximately 1000 and approximately 8 percent by weight of free NCO group.
[2] White pigment (50% TiO$_2$, 50% liquid epoxy).
[3] Dow Corning Corp. DC–200, flow control agent, a dimethyl polysiloxane fluid and having a viscosity in a range of 5 to 100 centistokes. This product is described in Dow Corning Corporation publications 3–107, dated September 1957, and Bulletin No. U–3–203, dated November 1958.

Mixing time for the above is 5 minutes, at which time the following catalyst is added:

| | |
|---|---|
| MOCA [4] at 250° F. | 112.5 |

[4] 4,4′ methylene-bis(2-chloroaniline).

Mixing time under vacuum is 4 minutes. The material is then flow-coated over the desired object slowly but continuously over a 12-hour period until a layer of 50 mils is obtained. Cure is accomplished at room temperature.

EXAMPLE 3

Two variants A and B for Example 2 are described in this example, wherein a different polyurethane, to yield a harder coating, and two catalyst systems are involved. Procedures are as in Example 2. The quantities of materials are indicated in the table below:

| | Parts by Weight | |
|---|---|---|
| | Variant A | Variant B |
| Adiprene LD–315 [1] | 100 | 100 |
| MOCA | 28 | |
| MDA (methylene dianiline) | | 21 |
| Pigment mix | 8 | 8 |
| Trichloroethylene | 25–50 | 25–50 |
| Silicone fluid | 0.07 | 0.07 |

[1] Having a molecular weight of approximately 1000, and approximately 8 percent by weight free NCO groups as referred to hereinbefore.

EXAMPLE 4

This example provides a suitable sysem to be used for casting a protective coating about a core centered in a mold, such as that described in conjunction with FIGS. 2 and 3. A two-part system is mixed in suitable equipment and introduced into the mold. The formulation involves a polyurethane modified with an epoxy.

Solution I:

| | Parts by wt. |
|---|---|
| Adiprene LD–167 [1] | 40 |
| MOCA | 34 |
| Epon 815 [2] | 60 |

[1] Polyurethane of E. I. du Pont de Nemours Co. having 6 percent by weight NCO and a molecular weight of approximately 1500 as described in Du Pont Bulletin No. 1, revised April 1963 and referred to in Development Products Report No. 13, dated October 1958.
[2] Shell Chemical Company liquid epoxy resin containing butyl glycidyl ether as reactive diluent and having a color at 25° C. on a Gardner Scale of 5 max. by ASTM D1544–58T; a viscosity of 5–7 poises at 25° C. by ASTM D445–53T and an epoxide equivalent of 175–195 by ASTM D1652–59T (Shell Chemical Company Data Sheet SC: 60–143 published 1960).

The polyurethane and epoxy are mixed at room temperature and the MOCA at 100° C. is added. The temperature of the mix is approximately 50° C. The post cure is 18 hours at 255° F.

EXAMPLE 5

This is a variant of Example 4 wherein the mix is usable at room temperature by varying the catalyst employed. Components are:

| | Parts by wt. |
|---|---|
| Adiprene LD–167 | 50 |
| Epon 815 | 50 |
| MDA | 24.7 |

There is a 7-minute gel time. The cure is accomplished by heating 18 hours at 255° F.

EXAMPLE 6

This example comprises a variant of Example 5 in which 100 parts of Adiprene L–213 as described in Du Pont Bulletin No. 11 published 1963 and Technical Information Sheet dated Mar. 28, 1961, 25 parts of MOCA, and 25 parts of MIBK [1] are cast around a wood core and cured for 24 hours at 100° C. This system yielded pins with six times the life of a commercial plastic-coated bowling pin.

[1] Methylisobutyl ketone.

EXAMPLE 7

This is a formulation suitable for compression molding around a wood bowling pin core.

A suitable two component commercial mixing machine is used to charge a heated mold. The mix is allowed to dwell in the mold and partially react. The material in this stage may be termed a "green stock." The "green stock" is then treated like a thermoplastic and molded around a wood core.

Formulation of the two-part mix is:

| | Parts by wt. |
|---|---|
| Adiprene LD-315 (100° C.) | 100 |
| MOCA (100° C.) | 25-30 |

The mix is charged into a mold cavity at approximately 100° C. and held for 4 to 30 minutes (8 minutes yields a material which flows well). A wood core is then placed in position and the mold is closed in a hydraulic press providing 60-70 tons pressure with heated platens. Cure can be effected by heating 2 hours at 100° C. under pressure or the whole may be removed from pressure in 5-15 minutes and a post cure of the coated bowling pin effected in an oven at 100° C. for two hours.

EXAMPLE 8

Coating by injection molding. In this procedure, a partially reacted material or "green stock" is used directly. The material comprises a TDI polyol prepolymer available commercially [1] (blended with 1% white (TiO$_2$) pigment).

Molding conditions are given below:

| | | |
|---|---|---|
| Cylinder temperature | ° F | 440 |
| Mold temperature | ° C | 80-90 |
| Cycle time | seconds | 90 |
| Injection pressure | lbs | 700 |

The wood core is suitably supported in a central position in the mold and the material is injection molded over the core. The pins are post cured in an oven for 3 hours.

Randomly selected, samples of bowling pins containing a plastic cladding over maple cores of compositions having formulations of Examples 1-8 were tested on a laboratory impact testing apparatus until the pins had been subjected to a number of blows on the impact tester representing actual rough bowling alley service. In each case, the coating was superior to the best commercially available plastic-coated pins prepared by multiple coating systems. The coatings in each case were free of cracks. They had excellent surface appearance and dirt resistance. In each set, scoring is excellent and constant throughout the life of the pin. The pins exhibited no loss of coating material and showed a negligible change in ball-line diameter.

[1] Available in varying molecular weights as Texin 192A and Texin 355D from the Mobay Chemical Co. The Texins are described in data sheets dated February 1962 and published by Mobay Chemical Company.

Although the bowling pins in the examples above are illustrative of a coating of about 50 mils thickness as a practical preference, the bowling pins of this invention can have a coating of a thickness of from almost 20 mils to about 200 mils.

It will be apparent to those skilled in the art that various modifications may be made in the teaching presented.

What is claimed is:

1. A bowling pin comprising a preformed wood body encased in a plastic protective cladding excluding a primer coating, said plastic protective cladding comprising a resinous layer of from about 20 to about 200 mils minimum overall thickness, the plastic composition comprising the reaction product of (A) a polyurethane reaction product comprising polyalkylene ether glycol and organic isocyanate selected from the group consisting of organic diisocyanates and triisocyanates and (B) a reactant selected from the group consisting of 4,4' methylene-bis (2-chloroaniline) and methylene dianiline.

2. A bowling pin comprising a preformed wood body encased in a plastic protective cladding excluding a primer coating, said plastic protective cladding comprising a resinous layer of from about 20 to about 200 mils minimum overall thickness, and formed of a composition comprising the reaction product of a polyalkylene ether glycol, an organic isocyanate and 4,4' methylene-bis (2-chloroaniline).

3. A bowling pin comprising a preformed wood body encased in a plastic protective cladding excluding a primer coating, said plastic protective cladding comprising a resinous layer of about 20 to about 200 mils minimum overall thickness, and formed of a composition comprising the reaction product of a polyalkylene ether glycol, an organic isocyanate and methylene dianiline.

References Cited

UNITED STATES PATENTS

| 2,944,821 | 7/1960 | Mason | 273—82 |
|---|---|---|---|
| 2,973,800 | 3/1961 | Muccino. | |
| 3,012,987 | 12/1961 | Ansul. | |
| 3,036,996 | 5/1962 | Kogon. | |
| 3,147,975 | 9/1964 | Gruss et al. | 273—82 |
| 3,220,731 | 11/1965 | Germino et al. | 273—82 |
| 3,130,102 | 4/1964 | Watson et al. | |

DELBERT B. LOWE, Primary Examiner

U.S. Cl. X.R.

118—7, 52